Patented Nov. 4, 1947

2,430,355

UNITED STATES PATENT OFFICE 2,430,355

PRODUCTION OF USEFUL PRODUCTS BY MICROORGANISMS ACTING UPON PREPARED SULFITE WASTE LIQUOR

Joseph L. McCarthy, Seattle, Wash.

No Drawing. Application June 7, 1944, Serial No. 539,194

12 Claims. (Cl. 195—84)

My invention relates to the production of useful products by microorganisms acting upon prepared sulfite waste liquor.

More particularly my invention relates to the production of useful products by microorganisms acting upon sulfite waste liquor which has been previously treated by steam stripping until the acidity thereof lies preferably in the range of pH 3.0 to 5.0.

Also, my invention relates to the production of a lignin containing liquor remaining after the microorganisms have acted upon the sulfite waste liquor to convert at least a part of the carbohydrate components thereof.

Sulfite waste liquor is developed during the manufacture of cellulose pulp from wood. One method for the manufacture of cellulose pulp from wood is carried out by treating wood in the form of chips in the presence of an aqueous solution containing metal salts of sulfites or bisulfites and usually some sulfurous acid. Usually the suspension is heated under pressure for a number of hours at temperatures of 130° to 140° C. In the course of this treatment, various complex chemical reactions proceed, the most important being those which result in the dissolving of most of the lignins and some of the carbohydrates but leaving undissolved fibrous impure wood cellulose. When this treatment has proceeded to the desired extent in a pressure digester, then the digester is "blown" and the impure wood cellulose suspended in the reaction liquid is permitted to flow from the digester to a tank called a "blow pit."

Separation is then accomplished of the impure fibrous wood cellulose which is subsequently purified by bleaching. There remains an aqueous solution containing most of the inorganic chemicals originally added as reagents and also containing those constituents of wood, or derivatives of those constituents of the wood, which dissolved during progress of the pulping treatment. This aqueous solution has been called "waste sulfite liquor" or "sulfite waste liquor."

Sulfite waste liquor from practically all pulp mills in the United States is at present disposed of by simply flowing it into streams or water courses whereby it is entirely wasted. While the composition of sulfite waste liquor may vary considerably depending upon (a) the wood treated, (b) upon adjustment of reaction variables during pulping, and (c) whether a paper pulp or a dissolving pulp is to be made, nevertheless, authoritative reliable analyses show that sulfite waste liquor contains three main classes of chemical compounds, i. e., inorganic substances, lignins, and carbohydrates. A considerable portion of the carbohydrates are present in sulfite waste liquor in the form of simple hexose or pentose sugars, some of which are fermentable. It must be remembered that these carbohydrates are present in the sulfite waste liquor in a very dilute condition. Thus, sulfite waste liquor, presently a waste product, provides a large source of raw material including carbohydrates which may be converted by microorganisms into useful products providing certain deleterious constituents can be economically separated therefrom or rendered inactive to a degree that will permit economic action of the microorganisms.

Sulfite waste liquor embodies as components sulfur dioxide, sulfurous acid, and derivatives of the latter. Sulfite waste liquor in the condition obtaining when the digester is blown, embodies said components in such quantities as are positively objectionable to the action of microorganisms generally so far as fermentation processes or so far as oxidative processes are concerned. These objectionable components of sulfite waste liquor are in free form and in combined form. In the combined form they are represented by compounds which have been developed under relatively high temperature and high pressure, and their economical elimination to a degree which will permit the use of the sulfite waste liquor for the action of microorganisms as herein set forth presents a real problem. An outstanding feature of this problem relates to the providing of a chemically and an economically suitable pH value. An object of my invention is to economically remove said objectionable components and provide a medium for the action of microorganisms having preferably an acidity being in the range of pH 3.0 to 5.0. Furthermore, the removal of these objectionable components of the sulfite waste liquor involves alteration of the oxygen content of the liquor which has a direct effect upon microorganism activity—some of the removal processes introduce oxygen and some eliminate oxygen.

Some processes for removing said objectionable components require the addition of chemical agents which render such processes relatively expensive in application.

Sulfur dioxide is toxic to many types of microorganisms and its use is permitted as a preservative, that is, to prevent growth of microorganisms and thus to prevent changes in materials as the result of the action of such microorganisms. This fact emphasizes the importance of its elimination from any medium to be acted upon by microorganisms for the production of useful products. Also, the presence of oxygen is objectionable—operating to reduce the yield of alcohols from a given quantity of sulfite waste liquor. This is due to the fact that oxygen is used by some microorganisms to make end products which are different from the desired end products, as alcohol. With certain organisms of the type of obligately anaerobic bacteria, for example, Clostridium acetobutylicum—the presence of oxygen will completely prevent fermentation.

The substantial absence of sulfur dioxide, sulfurous acid and derivatives of the latter, as well as readily hydrolyzable compounds of these with organic substances, and also the absence of oxygen enhance the character of the medium for fermentation by microorganisms at pH 3.0 to 5.0 To the degree that such are absent under such conditions of acidity, to that extent is the prepared sulfite waste liquor improved for fermentation. Fermentation involves absence of oxygen. Fermentation is slowed by oxygen because microorganisms will use oxygen for oxidizing the sugar and during this time the fermentation will occur inefficiently and there will be a lag in initiating reactions which provide the desired useful products.

The sulfite waste liquor also is strongly acid in character and this acidity must be overcome before the said liquor becomes suitable for action thereon by microorganisms.

Where the sulfite waste liquor is treated to neutralize the acid character of the liquor by addition of lime or limestone while agitating the suspension by bubbling air through it, there arises a serious objection. Such liquor so treated requires a relatively long time for fermentation. Moreover, the bubbling of air through the lime treated liquor may infect the liquor with undesirable microorganisms in the air. Also, such treatment with air renders the liquor less suitable for anaerobic microorganisms.

The fact that for many decades past there has been discarded daily by the pulp mills in the United States of America millions of gallons of sulfite waste liquor evidences the fact that its utilization involves most difficult problems.

In the past attempts have been made to prepare sulfite waste liquor for various purposes by evaporation which have involved the heating of the sulfite waste liquor at temperatures corresponding to atmospheric pressure or less than atmospheric pressure. In the course of such treatment, it has been known that some sulfur dioxide passes out of the sulfite waste liquor solution and into the vapor. It appears however that these attempts have been directed toward evaporation or concentration of the sulfite waste liquor directed towards securing, at minimum cost of steam, concentrated sulfite waste liquor suitable for burning to recover heat values. Economy in such evaporation is secured, among other ways, by multi-effect evaporation under vacuum by arts already well known. When circumstances permit, evaporation is conducted under the greatest vacuum or under minimum pressure for economy which corresponds to temperatures substantially less than the boiling point of sulfite waste liquor at atmospheric pressure. These processes were thus devoted primarily to low temperature operation.

In undertaking to eliminate by steam stripping components of sulfite waste liquor which are objectionable and positively inhibitive to the action of microorganisms by means involving conditions obtaining in steam stripping, particularly high temperatures, objections occurred among which are the following:

1. That such liquor prepared by a continuous process treatment would not make good ferment as there was not a sufficient concentration of carbohydrates and therefore not only for chemical but for economic reasons such steam stripping could not be reduced to a suitable process.

2. It was thought that there might be a serious destruction of sugar in such liquor at elevated temperatures such as would be necessary to eliminate objectionable components of the sulfite waste liquor assuming that such stripping in fact would serve to eliminate such components. It is well known that glucose is broken down at high temperatures in aqueous solutions and in the presence of derivatives of sulfurous acid. Also, it was thought that the amount of sulfur dioxide which would be evolved would be substantially only the free sulfur dioxide. As a matter of fact I have discovered that I can obtain sulfur dioxide in an amount a plurality of times greater than the amount of sulfur dioxide existing in the free state.

3. It was not thought possible to obtain a suitable pH value except by the use of neutralization methods, that is, by the addition of chemicals.

However, contrary to the above objections to steam stripping of sulfite waste liquor I have found or discovered the following:

Stated generally and briefly, and therefore incompletely, I have made the discovery that microorganisms will act efficiently upon sulfite waste liquor when said liquor has been subjected to steam stripping until the acidity thereof preferably lies in the range of pH 3.0 to 5.0.

I have discovered that a remarkable result is achieved by such stripping process in that sulfur dioxide is recovered from the sulfite waste liquor in amounts strikingly more than the amounts which might be anticipated as recoverable when the analytical composition of said sulfite waste liquor is considered. This latter unexpected result is secured apparently because, in addition to sulfurous acid and inorganic bisulfites and sulfites, apparent as such by analysis, there are present in sulfite waste liquor, as the result of reactions proceeding at the high temperatures and pressures obtaining during pulp cooking or digesting, certain compounds wherein sulfur dioxide and/or its derivatives are chemically combined with carbohydrates and/or lignins. In turn, under the conditions of elevated temperature and simultaneous removal of sulfur dioxide obtaining during steam stripping, hydrolysis of some of these compounds occurs with liberation into the sulfite waste liquor solution of free sulfur dioxide as sulfurous acid and/or its derivatives. Simultaneously with said hydrolysis, there is separated and removed from the liquor sulfur dioxide as fast as the same is liberated into the solution, so that an unbalanced condition is continuously maintained which permits the hydrolysis to continue. Experiments indicate that the hydrolysis proceeds as a complex reaction of the first order, i. e., in proportion to the concentration of the compound or compounds present in the sulfite waste liquor and hydrolyzable under the conditions of temperature, acidity, etc., existing during steam stripping.

I have also discovered that this steam stripped sulfite waste liquor at an acidity lying in the range of pH 3.0 to 5.0 is particularly suitable for action thereon by microorganisms. The results are particularly impressive with microorganisms functioning in anaerobic fermentation. Comparable experiments conducted at preferably about pH 4.0 to compare the rate of fermentation by yeast (*Saccharomyces cerevisiae* Carlsbergerensis) working on (a) glucose in aqueous solution, (b) sulfite waste liquor which had been prepared by aeriation and partial neutralization by and treatment with calcium hydroxide, and (c) sulfite waste liquor which had been prepared by steam stripping in accordance with my invention herein set forth, established that the rates or fermentation are very similar for glucose solution and for said steam stripped sulfite waste liquor. These rates of fermentation just mentioned have proven invariably to be faster by a wide margin than the rate of fermentation of the aerated and neutralized sulfite waste liquor.

While this particular culture of yeast was used, it is to be understood that my invention is not limited to this particular yeast, but this simply serves as an example. The above named yeast was employed because it is well recognized as one which is particularly well adapted for producing alcohol. It will be understood that glucose was used for the reason that it has been long recognized as a readily fermentable substance in aqueous solution by the above yeast microorganism and because it is a pure crystalline chemical compound which beyond any question is not in any wise contaminated with sulfur dioxide or any of the derivatives of the latter. It is thus strikingly apparent from the fact that the fermentation rate of the sulfite waste liquor prepared by steam stripping in accordance with my invention is approximately the same as that obtaining for the glucose solution that my discovery involves providing a carbohydrate source from a heretofore waste product which is characterized by being particularly adapted for treatment by microorganisms for fermentation. Also, such experiment shows that the steam stripped sulfite waste liquor of my invention is characterized by the thoroughness of the elimination components objectionable to the action of microorganisms and the economic providing in a continuous process of a sulfite waste liquor at a pH value preferably lying in the range of pH 3.0 to 5.0. Experiments indicate that my invention is applicable to microorganisms generally—that is, those acting in anaerobic fermentation as well as those which operate as oxidative agents. I have used many anaerobic fermenting microorganisms with sulfite waste liquor steam stripped according to my invention as the substrate and also many oxidative agents and the results have always been uniformly favorable.

Of course, it will be understood that when sulfite waste liquor treated by steam stripping according to my invention is subjected to the action of microorganisms by anaerobic fermentation or oxidative processes that the necessary standard and well known nutrients are of course added.

The process of steam stripping of waste sulfite liquor may be conducted in a packed tower, or in a plate column, or in any other equipment normally used in chemical engineering practice for carrying out such an operation. To exemplify the steam stripping of this invention, the following two applications are cited:

*Example I.*—Sulfite waste liquor preheated to the operating temperature of the tower is permitted to flow continuously by gravity at the rate of about five liters an hour into the top of an insulated Pyrex glass tower about 30 mm. in diameter, one meter long, and packed with ¼ inch carbon Raschig rings. Steam is flowed into the bottom of the tower and up through the tower. Vapors consisting of steam, sulfur dioxide and volatile constituents of sulfite waste liquor rise from the top of the tower and are removed and piped to a condenser wherein they are condensed to liquid phase; this latter distillate, comprising a sulfur dioxide solution, may be reused in ordinary sulfite pulp processing systems. The stripped waste sulfite liquor flows as an effluent from the bottom of the packed tower and by use of suitable heat exchangers, it is cooled to the temperature desired for further processing by action of microorganisms.

Two different waste sulfite liquors processed by steam stripping at 100° C. at atmospheric pressure gave the following results:

| Sample | Steam Used in Processing per liter of S. W. L. | Loosely combined Sulfur Dioxide per liter of S. W. L. | | pH of S. W. L. | | Sulfur Dioxide recovered per liter of S. W. L. Processed |
|---|---|---|---|---|---|---|
| | | Raw | Stripped | Raw | Stripped | |
| A | (g.) 50 | (g.) 7 | (g.) 3 | 2.1 | 4.1 | (g.) 3 |
| B | 100 | 14 | 3 | 1.5 | 4.5 | 10 |

*Example 2.*—Sulfite waste liquor may be preheated to the operating temperature of the tower, and then pumped continuously at the rate of about five gallons per hour onto the top plate of a twelve plate stainless steel stripping bubble cap column. This column may be about twelve feet high with an inside diameter of five inches; plates may be one foot apart and on each plate sulfite waste liquor would be retained to a depth of about six inches. Steam may be flowed into the bottom of the tower. Vapors, consisting of steam, sulfur dioxide, and volatile constituents of sulfite waste liquor, will rise through the tower by passage through the bubble caps on each plate; these vapors ordinarily are removed from the top of the tower and are piped to a condenser wherein they are condensed to a liquid phase. This latter distillate, comprising a sulfur dioxide solution, may be reused in ordinary sulfite pulp processing systems. The stripped sulfite waste liquor may flow as an effluent from the bottom of the plate stripping column through suitable heat exchangers by use of which it may be cooled to the temperature desired for further processing by microorganisms in accordance with my invention.

While my discovery establishes that sulfite waste liquor by steam stripping may have its acidity reduced readily to the range of pH 3.0 to 5.0, so that it is in a condition suited immediately and without further treatment so far as removal of objectionable components, for action thereon by microorganisms, nevertheless, the advantages of my invention may be secured in part by steam stripping to a pH less than 3.0. The preferred range of pH 3.0 to 5.0 of my prepared sulfite waste liquor provides for optimum results in the action of microorganisms. But useful results may be obtained by causing microorganisms to act upon sulfite waste liquor steam stripped according to my invention to a pH of less than 3.0. Furthermore, such sulfite waste liquor with a pH of less than 3.0 may be further treated with chemicals to partially or completely neutralize said liquor. Such further neutralized liquor may be subjected to microorganism activity.

As an example of the use in anaerobic fermentation of the steam stripped sulfite waste liquor prepared in accordance with this invention, steam stripped sulfite waste liquor at about pH 4.0 and containing about 36 grams per liter of reducing sugars, issuing from a stripping column is cooled in the substantial absence of air and under substantially aseptic or sterile conditions to a temperature of about 30° C. and then may be flowed directly and without neutralization to fermenter tanks wherein for each 100 parts of the said sulfite waste liquor, there may be added about four parts of the yeast *Saccharomyces cerevisiae* Carlsbergerensis. Fermentation begins almost immediately and with mechanical agitation and in substantial absence of air fermentation proceeds rapidly with carbon dioxide evolution, if the temperature is maintained at about 30° C. Fermentation at said yeast concentration, said pH value, said temperature, and in substantial absence of air and at or near atmospheric pressure is completed in about two to six hours, whereupon, preferably after separation of the yeast, the fermented sulfite waste liquor is distilled to recover the ethyl alcohol formed in the fermentation. The steam stripped sulfite waste liquor remaining after fermentation contains about 10 to 15 grams per liter of reducing sugars. It will be understood that the above specified factors and conditions are only exemplary and preferred specifications. If the yeast concentration is less, the fermentation is slower, and vice versa. If the acidity is greater, the fermentation is slower and vice versa. If a pressure is maintained slightly above atmospheric pressure then the possibility of infection by "wild" microorganisms is less.

As a further example of the use, by microorganisms in oxidative processes, of the steam stripped sulfite waste liquor prepared in accordance with this invention, steam stripped sulfite waste liquor at about pH 4.0 issuing from a stripping column may be cooled under substantially aseptic or sterile conditions to a temperature of about 30° C. and then flowed directly and without neutralization to tanks suitable for the continuous propagation of yeast. About one part of yeast suspension may be added continuously to the yeast propagation tanks for each one hundred parts of the incoming sulfite waste liquor along with small amounts of ammonium hydroxide and autolyzed yeast as nutrients. Aseptic or sterile air in the form of small bubbles may be continuously passed through the suspension of yeast in steam stripped sulfite waste liquor while the growth of the yeast proceeds. Growth of the yeast may proceed at such a rate that at the end of about two hours, there will be utilized substantially all of the carbohydrates in the steam stripped sulfite waste liquor which the yeast, operating under oxidative conditions, is capable of utilizing. After completion of the yeast growth, the yeast is separated from the residual sulfite waste liquor. The steam stripped sulfite waste liquor remaining after yeast propagation thereon contains less than 15 grams per liter of reducing sugars. It will be understood that the above factors and conditions are only exemplary and preferred specifications. The same observations set forth at the end of the next preceding paragraph are here incorporated by reference.

Advantages of my invention are:

Application of this invention permits recovery of sulfur dioxide from sulfite waste liquor in amounts remarkably greater than would be expected from the analytical composition of sulfite waste liquor. The value of the sulfur dioxide recovered and suitable for reuse may be substantially equal to, or contribute greatly to, the cost of the steam required to carry out the processing. This is "may be" because the recovery will depend upon the character of the sulfite waste liquor as herein set forth, as well as upon the efficient operation of the stripping mechanism. Application of this invention provides for economically decreasing to a chemically suitable degree the acidity of sulfite waste liquor. In applying the invention to various sulfite waste liquors, I have found that the optimum acidity of suitably steam stripped sulfite waste liquor for the action of microorganisms lies in the range of pH 3.0 to 5.0 when there is taken into account both the step of steam stripping and the step of treating the stripped sulfite waste liquor with microorganisms. It is my experience that sulfite waste liquor from pulp for the manufacture of paper may be readily steam stripped to pH 3.5 to 4.5, while sulfite waste liquor from pulp manufactured for dissolving purposes may be readily steam stripped to pH 3.0 to 4.0. When sulfite waste liquor in the condition freshly received from the digester is allowed to stand for a period of some days, a change occurs in its characteristics so that it becomes more difficult to secure the desired pH value by steam stripping.

In addition, application of this invention provides a continuous process for production of a sulfite waste liquor at a degree of acidity suitable for direct and immediate processing by action of microorganisms, thus avoiding the expense previously incurred by addition of lime or other chemicals heretofore thought necessary to bring about substantial neutralization of sulfite waste liquor.

The sulfite waste liquor is more suitable for the production of useful compounds or products by microorganisms operating as oxidative agents, because such agents operate best where the sulfur components, as sulfur dioxide, sulfurous acid, and derivatives of the latter are reduced or absent. Since the step of stripping according to my invention reduces the acidity to the range of pH 3.0 to 5.0, the liquor in this respect is particularly well prepared. However, such step also removes the oxygen, but this element can be readily supplied in various ways. One of these may be by causing sterile air to bubble through the treated sulfite waste liquor for microorganisms acting as oxidative agents. It will be noted that for anaerobic fermentation, the sulfite waste liquor prepared in accordance with my invention is particularly suitable because of the elimination of the oxygen during the steam stripping.

In addition, application of this invention gives a steam stripped sulfite waste liquor characterized by being remarkably low in concentration of sulfites, bisulfites, and sulfurous acid, and of readily hydrolyzable compounds wherein sulfur dioxide or its derivatives are chemically combined with carbohydrates and/or lignin. Thus the stripped sulfite waste liquor is extraordinarily suitable as a substrate to be acted upon by microorganisms. For example, whereas alcoholic fermentation of the usual sulfite waste liquor prepared by the process comprising neutralizing and air agitation may require about 20 to 72 hours, the fermentation of steam stripped sulfite waste liquor in accordance with my invention having a pH value of 3.0 to 5.0 may be substantially completed in a period of time approximately equal to that required for the converting or fermenting of glucose. Yeast growth proceeds extraordinarily rapidly in steam stripped sulfite waste liquor.

In addition, application of my invention substantially avoids any oxidation to sulfate of the sulfur dioxide derivatives dissolved in sulfite waste liquor. Such oxidation does occur when air is bubbled through sulfite waste liquor in accordance with said neutralization by lime method. Avoidance of the formation of sulfates is highly desirable, for example in processing sulfite waste liquor to ethyl alcohol since if sulfite waste liquor holds sulfates in high concentration, then some of these sulfates may precipitate and form scale in an alcohol rectification column, or in heat exchangers, and other pieces of equipment and thereby seriously interfere with efficient operation of these processing units.

In addition to avoiding sulfate difficulties, application of my invention of steam stripping removes from sulfite waste liquor the free and some combined sulfur dioxide which is hydrolyzable at the operating temperature, pressure, time, and acidity of the steam stripping column. When the carbohydrates present in steam stripped liquor have been, for example, fermented to give alcohol, then in the process of distilling out the alcohol from the sulfite waste liquor, the vapors from steam stripped sulfite waste liquor in accordance with my invention do not contain important amounts of sulfur dioxide. The vapors from steam stripped sulfite waste liquor are therefore practically non-corrosive, a very important and practical beneficial result. Moreover, when after, for example, alcoholic fermentation, the vapors are condensed, an alcohol distillate is secured which is substantially not contaminated by the presence of sulfur dioxide. On the other hand, when fermented sulfite waste liquor, prepared by the air blowing-neutralization technique of prior practice, is subjected to distillation for recovery of alcohol, sulfur dioxide in appreciable concentration is present in the vapors and this sulfur dioxide will cause serious corrosion of distilling or rectifying equipment, and, in addition, some of the sulfur dioxide will pass over into the distillate and there comprise an impurity in the alcohol product.

The practice of this invention is not to be limited to the two types of apparatus for steam stripping or to the operating conditions exemplified above. Any apparatus or equipment will suffice in which the process of steam stripping may be carried out. The operation of stripping may be carried out at atmospheric pressure, and preferably at pressures greater than atmospheric pressure. For a given time of reaction, the higher the temperature of operation, the greater will become the amounts of sulfur dioxide recovered and also the higher will become the pH of the effluent stripped sulfite waste liquor; i. e., the less acid it becomes. The time of stripping can be increased in a packed column by making the column longer, and in a plate (a) feeding a given column at a slower rate, (b) adding more plates, (c) increasing the volume of liquid retained on the plates. For other constant conditions of reaction, the greater the amount of steam passed into a stripping column per unit volume of sulfite waste liquor fed, the greater will be the amount recovered of sulfur dioxide per unit sulfite waste liquor processed. Steam stripping within the conception of this invention may be carried out upon the sulfite waste liquors from wood cellulose pulp mills using the bisulfite process with such bases as calcium, magnesium, sodium and ammonium.

In addition to steam, other stripping gases which do not oxidize sulfur dioxide under conditions of steam stripping may be passed through the column along with the steam in order to facilitate the stripping. Carbon dioxide is an example of such a gas.

I claim:

1. The process of producing useful products from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; and collecting the said treated liquor in the substantial absence of air.

2. The process of producing useful products from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; and adding to said collected liquor yeast.

3. The process of producing ethyl alcohol from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; adding to said collected liquor, yeast acting under anaerobic conditions for the production of ethyl alcohol; and causing fermentation to continue in substantial absence of air until a substantial portion of the reducing sugars of said liquor is converted into ethyl alcohol.

4. The process of producing useful products from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; adding to said collected liquor, yeast acting under aerobic conditions for the propagation of yeast; and causing propagation to continue at approximately 30° C. until a substantial portion of the reducing sugars of said liquor is converted.

5. The process of producing useful products from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; adding to said collected liquor, yeast of the Saccharomyces genus acting under aerobic conditions for the propagation of yeast; and causing propagation to continue at approximately 30° C. until a substantial portion of the reducing sugars of said liquor is converted.

6. The process of producing useful products from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; adding to said collected liquor, yeast of the Torula genus acting under aerobic conditions for the propagation of yeast; and causing propagation to continue at approximately 30° C. until a substantial portion of the reducing sugars of said liquor is converted.

7. The process of producing ethyl alcohol from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; adding to said collected liquor, yeast acting under anaerobic conditions for the production of ethyl alcohol; and causing fermentation to continue in substantial absence of air until about two-thirds of the reducing sugars of said liquor is converted into ethyl alcohol.

8. The process of producing ethyl alcohol from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; adding to said collected liquor, yeast acting under anaerobic conditions for the production of ethyl alcohol; and causing fermentation to continue in substantial absence of air for a period less than ten hours.

9. The process of producing ethyl alcohol from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in substantial absence of air; adding to said collected liquor, yeast of the Saccharomyces genus in the substantial absence of air to develop fermentation; and causing fermentation to continue in substantial absence of air until about two-thirds of the reducing sugars of said liquor is converted into ethyl alcohol.

10. The process of producing ethyl alcohol from sulfite waste liquor comprising continuously passing sulfite waste liquor in an attenuated stream countercurrent to a stream of steam in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in substantial absence of air; adding to said collected liquor, yeast of the Saccharomyces genus in the substantial absence of air to develop fermentation to produce ethyl alcohol; and causing fermentation to continue in substantial absence of air for a period of time substantially equal to that required for fermentation of an aqueous solution of glucose under anaerobic conditions with the same genus of yeast under the same concentration and the same pH value to produce ethyl alcohol.

11. The process of producing ethyl alcohol from sulfite waste liquor comprising continuously passing sulfite waste liquor in an attenuated stream countercurrent to a stream of steam and an inert gas in the substantial absence of air (a) in which the temperature of the sulfite waste liquor is not less than about 100° C. and (b) until the acidity of said liquor is reduced to a pH in the range of 3.0–5.0; removing with steam from the attenuated stream of sulfite waste liquor the sulfur dioxide derived from sulfurous acid, from inorganically combined sulfites and from sulfur-organic compounds of said liquor; collecting the said treated liquor in the substantial absence of air; cooling said collected liquor to about 30° C. in the substantial absence of air; adding to said collected liquor, yeast acting under anaerobic conditions for the production of ethyl alcohol; and causing fermentation to continue in substantial absence of air until a substantial portion of the reducing sugars of said liquor is converted into ethyl alcohol.

12. The process of producing useful products from sulfite waste liquor comprising continuously passing sulfite waste liquor in an attenuated stream countercurrent to a stream of steam in the substantial absence of air until the acidity is reduced below a pH of 3.0; removing with steam from the attenuated stream of sulfite waste liquor the sulfur dioxide derived from sulfurous acid, from inorganically combined sulfites and from sulfur-organic compounds of said liquor; and collecting the said treated liquor in the substantial absence of air.

JOSEPH L. McCARTHY.

REFERENCES CITED

The following references are of record in the file of this patent:

UNITED STATES PATENTS

| Number | Name | Date |
|---|---|---|
| 1,510,196 | Romer | Sept. 30, 1924 |
| 1,261,005 | Barstow et al. | Apr. 2, 1918 |
| 1,284,740 | McKee | Nov. 12, 1918 |
| 2,161,798 | Carter | June 13, 1939 |
| 1,686,913 | Jaeger | Oct. 9, 1928 |
| 1,273,392 | McKee | July 23, 1918 |